Figure 1:
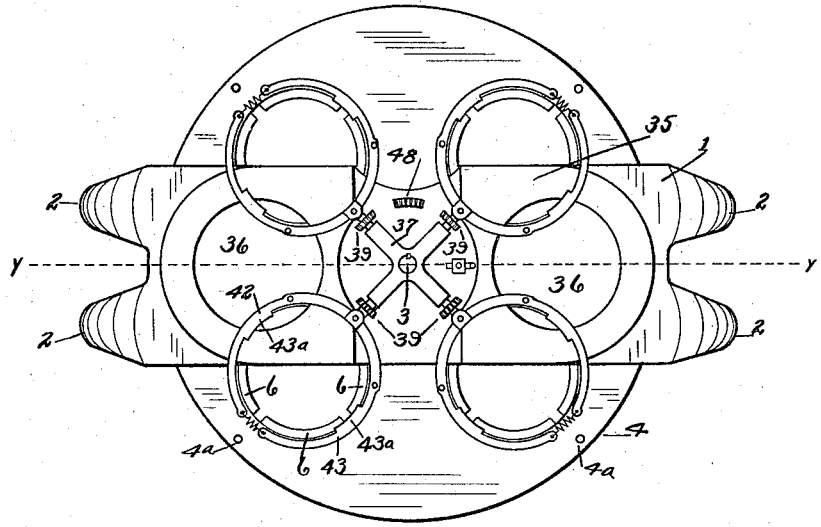

J. W. LAWHEAD.
AUTOMATIC BAKING MACHINE.
APPLICATION FILED JUNE 5, 1911.

1,150,211.

Patented Aug. 17, 1915.
2 SHEETS—SHEET 1.

Witnesses
Inventor
James W. Lawhead
By
Attorney

J. W. LAWHEAD.
AUTOMATIC BAKING MACHINE.
APPLICATION FILED JUNE 5, 1911.

1,150,211.

Patented Aug. 17, 1915.
2 SHEETS—SHEET 2.

Witnesses

Inventor
James W. Lawhead
By C. C. Shepherd
Attorney

UNITED STATES PATENT OFFICE.

JAMES W. LAWHEAD, OF WILMINGTON, OHIO.

AUTOMATIC BAKING-MACHINE.

1,150,211.  Specification of Letters Patent.  Patented Aug. 17, 1915.

Application filed June 5, 1911. Serial No. 631,461.

*To all whom it may concern:*

Be it known that I, JAMES W. LAWHEAD, a citizen of the United States, residing at Wilmington, in the county of Clinton and State of Ohio, have invented certain new and useful Improvements in Automatic Baking-Machines, of which the following is a specification.

My invention relates to the improvement of automatic baking machines, and the objects of my invention are to provide an improved baking device of this character, wherein the production of baked products may be rapidly and uniformly accomplished, and whereby the batter or mixture forming the body of the products, may be thoroughly and uniformly heated; to provide means for automatically discharging the baked products from the baking pans and for oiling both sides of said pans, and to produce certain improvements in construction and operation which will be more fully pointed out hereinafter.

In the realization of my conception, the machine preferably utilized by me is constituted of a heating chamber and a multiplicity of relatively independent and absolutely unconnected baking units. These units are each subject to and are caused to perform a complete cycle, in the course of which they are required to pass through the heating chamber. While, in the form shown, the units are absolutely independent with relation to each other, my machine is of such form that the units in their passage through the heating chamber are adapted to have a coöperative action upon each other, being of peculiar form, to effect an even and uniform baking of the batter. More explicitly, it may be explained that the baking units are preferably formed of spaced walls or plates having their outer surfaces constructed to become the actual baking surfaces. These units are thus adapted to be arranged with their baking surfaces in parallel relation to each other and only spaced apart by the batter. This is the preferred arrangement of passing them through the heating chamber and in this manner the batter is firmly maintained between the baking surfaces, while the air between the spaced walls of each unit is necessarily heated by the provided heating means to be hereinafter described. In conjunction with this heating chamber and in juxtaposition thereto, there is preferably provided a second chamber of similar form, which constitutes a return passage for the heating units. It will be understood that there must be devised some means for selecting each baking unit as it is emitted from the heating chamber and I have adopted a preferred form in the shape of a power driven rotatable spider carrying automatic gripping jaws. Each gripping jaw is constructed to automatically select each baking unit upon its exodus from the heating chamber and to conduct it to a point in alinement with the return chamber or passage, whereupon an especially provided device becomes operable to release said gripping jaw. Furthermore, in the travel of this gripping jaw from the mouth of the heating chamber to the return chamber, I desirably provide a means for rotating the gripping jaw and thus inverting the baking unit to dump the baked product.

The initial delivery of the batter to the baking unit and the subsequent delivery of the said baking unit to the heating chamber is effected by the provision of a rotatable plate having a plurality of plate sockets and concentrically disposed beneath the heating chamber and the return chamber. In explanation, it may be stated that the heating chamber and the return chamber are open at the bottom and are superposed above the rotatable socketed plate in such a manner that the proper positioning of the rotatable plate in its course of rotation will bring the said sockets beneath the said chambers. Complemental to the said sockets, there are provided cam operated plungers and there is also provided a means for automatically stopping the rotatable plate at the proper point and subsequently releasing the same.

The plates are initially stacked in the return chamber and held therein by pawls which are releasable by one of said cam operated plungers, whereupon a baking unit or plate is dropped into the alining socket. Further operation of the machine moves the socket carrying the plate to a position for the receipt by the plate of the batter. Still further operation of the machine, moves the socket carrying the plate with the batter thereon to a point beneath the heating chamber and above the other cam operated plunger. The next step in the operation of the machine is the elevation of this plunger, which causes the plate with the batter thereon to move upwardly into the heating chamber where it is retained by automatic pawls therein.

I have found it extremely desirable to provide an oiling device for these plates and in the present form, it comprises an oiling pad upon the last mentioned plunger. It will be well understood that the operation of this oiling pad is rendered effective upon both sides of the baking units or plates, by the inversion of the plates upon the rotation of the gripping jaws as heretofore mentioned and in this manner each plate is oiled upon both sides in the course of its passage through two cycles of the machine.

It will be seen from the above, that the action of this machine in the form shown, is in the nature of a step-by-step operation and the driving gearing and mechanism provided is of such form as to attain the most essential results in the way of starting and stopping the machine.

The provision of these independent units and the method of bringing them together after the batter is deposited, is extremely efficacious, owing to the spreading effect upon the batter. Furthermore, in the utilization of these separate plates and in the adaptation of the rotatable gripping jaws, it will be seen that it is a simple matter to maintain the baking surfaces of the plates in oiled condition at all times. Furthermore, the batter is completely inclosed and subjected to a comparatively even heat from all sides.

Figure 2:
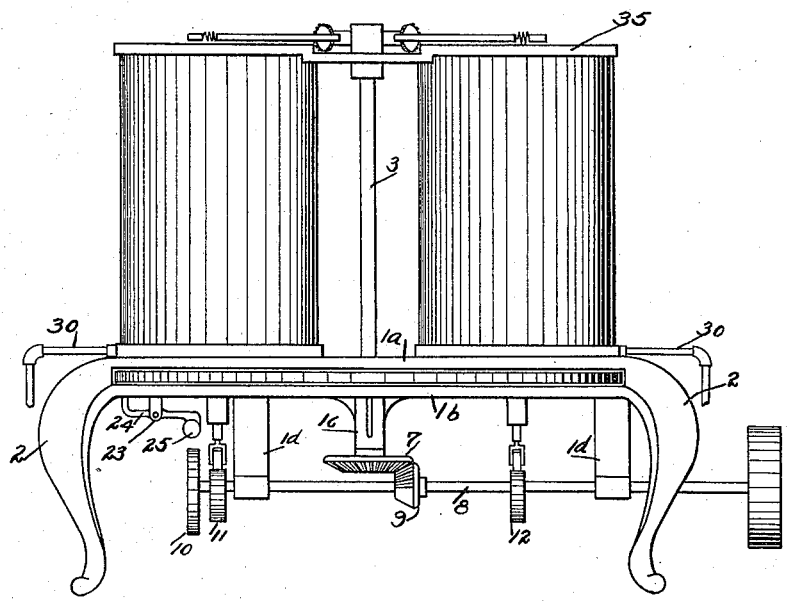
Figure 3:
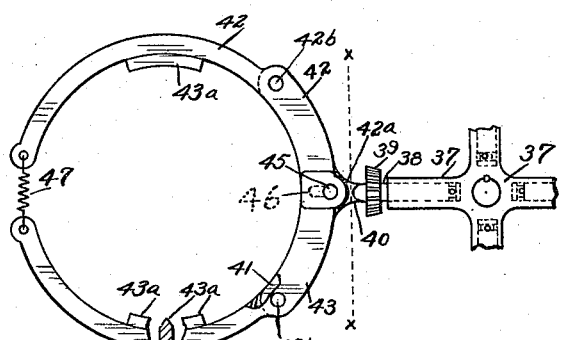
Figure 4:
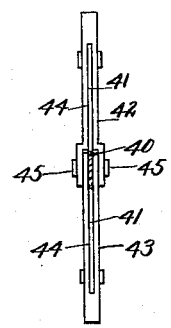
Figure 5:
Figure 6:
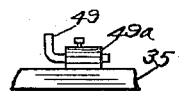
Figure 7:
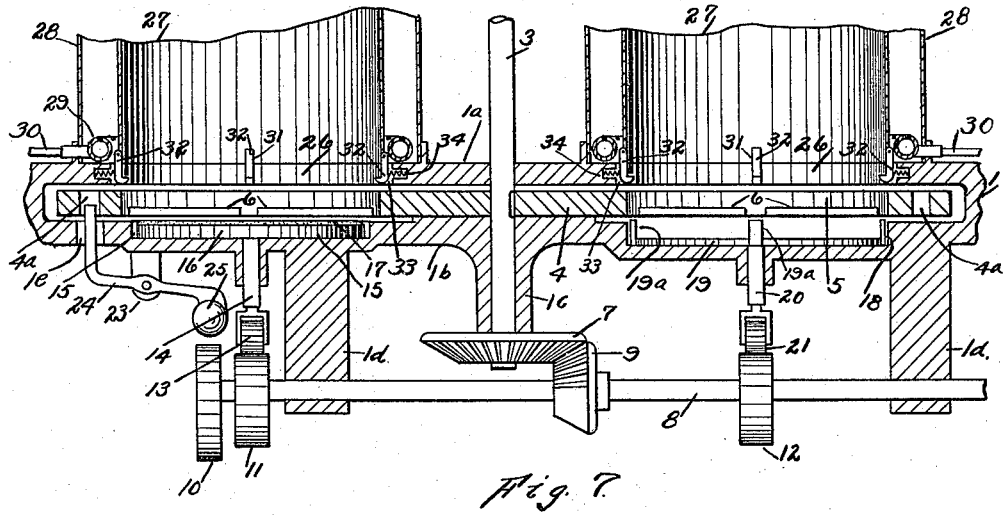
Figure 8:
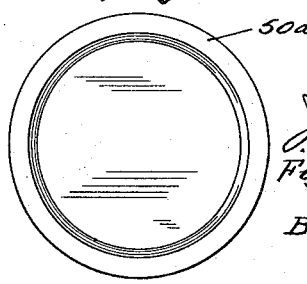

These objects I accomplish in the manner illustrated in the accompanying drawings, in which:

Figure 1 is a plan view of my improved baking machine, Fig. 2 is a side elevation of the same, Fig. 3 is a detail plan view of one of the baking pan conveying and depositing devices, Fig. 4 is a sectional view on line $x$—$x$ of Fig. 3, Fig. 5 is a central sectional view of one of the baking pans, Fig. 6 is a detail view in elevation of a contact member which I employ in the manner hereinafter described, for the purpose of opening the sections of one of the pan carrying devices or clamps, Fig. 7 is a central sectional view of the lower portion of the machine taken on line $y$—$y$ of Fig. 1, and, Fig. 8 is a plan view of one of the baking pans.

Similar numerals refer to similar parts throughout the several views.

In carrying out my invention, I employ an oblong base or supporting frame 1 which may be supported at the desired height by suitable legs or standards 2. The horizontally disposed base plate 1 is slotted or recessed centrally and horizontally, thus forming the upper and lower parallel base plate members $1^a$ and $1^b$. Between these members is carried centrally upon a vertical shaft 3, a disk or circular plate 4, which plate has formed therein about its center, a circular arrangement of equidistant vertical openings 5. Within the lower end portion of each of these openings are provided inwardly projecting separated lugs 6. The shaft 3 on which is carried the disk 4 has its lower portion extending downward through a bearing member $1^c$ from the lower plate member $1^b$ and carries on its lower end a bevel gear wheel 7. Beneath this gear wheel and rotatably bearing in arms $1^d$, which depend from the plate 1, is a horizontally disposed shaft 8 on which is carried a bevel pinion 9, this pinion being in position to gear with the teeth of the bevel wheel 7, but being provided with gear teeth only over half of its engaging surface. Upon one end of the shaft 8 is a cam plate 10 and on the inner side of said cam plate, is carried on said shaft a second cam body 11. A third cam body 12 is also carried on the shaft 8 on the opposite side of the pinion 9 from that on which the cams 10 and 11 are located. The cam 11 has bearing upon its surface a roller 13, which is journaled in the lower end of a plunger 14, which extends loosely through the lower member $1^b$ of the plate 1 and into a circular depression or socket 15 formed in the upper side of the plate member $1^b$, in which depression is normally seated a circular plunger head 16, the latter having its upper side padded or covered as indicated at 17 with a suitable oil absorbing material. At a point in the upper side of the frame member $1^b$ diametrically opposite the depression 15 and beneath the circular line of openings 5 of the disk 4 is a second depression or seat 18, in which is adapted to be seated a plunger head or disk 19 which is mounted on the upper end of a vertical plunger 20 which passes through the opening in the bottom of the plate member $1^b$ and which has pivoted in its lower end a roller 21, the latter bearing upon the periphery of the cam body 12. The circular head 19 has its edge portion provided at intervals with upwardly extending fingers $19^a$ which are adapted when one of the openings 5 of the disk 4, is immediately over the plunger head 19 and when said plunger head is raised, to enter and pass through the spaces between the ends of the separated lugs 6. The outer or marginal portion of the disk 4 has formed therein vertical openings $4^a$, one for each of the openings 5, and pivoted to a suitable hanger 23 beneath the frame 1, is a bell crank lever 24, the upturned arm of said lever extending, as shown in Fig. 7, through an opening $1^e$ in the lower member of the frame plate $1^b$. The upper terminal portion of this bell crank arm is adapted to contact with the under-surface of the disk 4, or to successively engage the openings 4ª of said disk, said bell crank arm being retained in an elevated position through the medium of a weight 25 which is carried on the opposite end of the bell crank, said weight being arranged immediately above the cam body 10 of the shaft 8.

Formed in the upper member 1ª of the plate 1, are equidistantly arranged circular openings 26 which are adapted to register with the openings 5 of the disk 4, when said disk is rotated to predetermined positions. Rising from each of these openings 26 and communicating therewith is a cylindrical body 27 and about each of said cylinders and at a distance therefrom is provided an external cylindrical casing 28. Within the lower portion of the annular space formed between the cylinders 27 and 28 is arranged a circular gas burner 29 with which is connected a pipe 30, leading from a suitable source of gas supply. Pivoted in slotted openings 31 in the lower end portion of each of the cylinders 27, are the upper ends of a plurality of depending hooks 32, these hook members extending downward within lateral offsets 33 of the opening 26 and having the lower ends projected into said opening 26. Each of the hooks 32 has its outer side bearing against a spring 34 which rests within a socket of the frame member 1ª.

The upper end portion of the shaft 3 is journaled in a top plate 35 which is parallel with the base plate 1 and which surmounts the cylinders 27 and 28, as shown more clearly in Figs. 1 and 2 of the drawing. The top plate 35 is provided on opposite sides of its center with circular openings 36, which communicate with the upper ends of the cylinders 27. Upon the upper end of the shaft 3 and above the plate 35 is carried a horizontally disposed spider or head consisting of four arms 37 which radiate from a common center. Within each of these arms is formed a longitudinal socket in which is journaled one end of an outwardly extending shaft 38 (see Fig. 3). Each of these shafts 38 carries on the outer side of the corresponding arm 37 a bevel pinion 39 beyond which said shaft is flattened as indicated at 40, said flattened shaft portion terminating in a curved yoke 41 the arms of which are indicated in full lines in Fig. 4 and the ends of which arms are indicated in dotted lines in Fig. 3. 42 and 43 represent clamping and carrier ring sections. The rear portions of these sections are bifurcated as indicated at 44 and the section 42 has an enlarged terminal bifurcation into which the corresponding end of the section 43 fits, said sections being respectively pivoted as at 42ᵇ and 43ᵇ and being loosely connected by a pin 45, this pin passing through a slotted opening 46 in the center of the yoke-like termination of the shaft 38. The substantially semi-circular clamping members 42 and 43 are connected at their outer ends by a suitable spring 47 and each of said sections 43 had formed on its inner side an inwardly projecting beveled lug 43ª. On the plate 35 and in the rotary path of the pinions 39 is provided a fixed rack section 48. I also provide the plate 35 at the center of its width and at a point on one side of the shaft 3 with an upwardly projecting contact member 49 which, as shown in the drawing, may be in the nature of an angular member adjustably held in a suitable bracket 49ª.

In the operation of my device, I employ a comparatively large number of baking pans, one of which is indicated in Figs. 5 and 7 of the drawing, these pans being of such form or outline as to be movable when in horizontal positions, upwardly or downward in the cylinders 27. In the illustration of my invention, I have omitted showing the pans therein, for the sake of clearness. Each of the pans referred to and one of which is indicated at 50, preferably comprises two parallel connected upper and lower plates 50ª, each of said plates having a cake or batter receiving depression.

For the purpose of illustrating the operation of my invention, we will assume that the cylinder 27 to the right in the drawing, is filled from top to bottom with the pans 50, one resting upon the other, these baking pans being empty and the bottom pan having its marginal portion resting upon the inturned ends of the hook members 32 of said cylinder. It will be understood that rotary motion may be imparted to the shaft 8 from any suitable source of power and that as said shaft 8 rotates, its cam body 12, or that portion thereof which extends the greater distance from the shaft, will contact with the roller 21 and operate to raise the plunger 20 until the fingers 19ª of the head 29 come into contact with the rounded lower ends of the hook members 32 and press the latter back against the springs 34, thereby releasing the last pan 50 which is received by the previously elevated plunger head 19.

As the roller 21 passes out of contact with the point of greatest projection of the cam 12, it is obvious that the plunger head will descend toward the position indicated in the drawing and in its operation, the edges of the last released pan will be engaged and supported by the lugs 6 of one of the openings 5. In this connection, it will be understood that during the above described operation, the segmental pinion 9 is temporarily out of gear with the gear wheel 7, with the result that the disk 4 is at rest, with two of its openings 5 immediately beneath the openings 26 in the upper member of the base plate and likewise immediately beneath the cylinders 27. It will also be seen that the disk 4 will be locked in its non-rotative position, by the engagement of the upwardly extending arm of the lever 24 with one of the openings 4ª of the disk 4 and at the proper time the engagement of the lever and disk will be discontinued through the elevation of the lower end of the lever produced by a contact of the projecting portion of the cam 10 with the weight 25. As the lever 24 is thus released from engagement with the disk opening 4ª, the teeth of the segmental pinion 9 can come into gear with the teeth of the wheel 7, thus imparting, through the rotation of the shaft 3, a quarter revolution of the disk 4 before the gear wheels 7 and 9 are out of engagement. This operation brings new openings 5 of the disk opposite the depressions 18 of the frame. When the lower pan 50 is released from engagement with the hooks 32 of the cylinder on the right, it is obvious that the next higher pan will drop into engagement with said hooks as the latter are pressed into their normal positions by the springs 34 and as the disk 4 completes its quarter revolution as described, it will be understood that the first released pan will have been carried to a point at right angles with its former position, in which position the upper depression of said pan is adapted to receive a charge of batter or baked mixture.

Following the travel of the first removed pan, it is obvious that when the gear wheels 7 and 9 again come into mesh, the newly filled pan will be carried by the disk to a position immediately beneath the cylinder 27 on the left, where the movement of the disk will again be retarded by the means hereinbefore described. Said gear wheel again being out of mesh and the shaft 8 continuing to rotate, it will be understood that the projecting portion of the cam 11 will by contact with the roller 13, operate to raise the plunger 14 and its head 16 until the latter, by contact with the underside of the pan, moves the pan upward until by contact of the marginal portions of the pan with the lower terminal portions of the hooks 32, said hooks are moved outward and, through action of the springs 34, they are again pressed inward to engage the underside of the marginal portion of the pan, in which position said pan is held until a second pan in being brought to the same position, elevates said first pan. In the manner described, it will be understood that the pans contained in the cylinder 27 to the right, will be successively released from said right hand cylinder, carried to a point between the cylinders, filled with batter, thence carried to a point beneath the cylinder to the left and elevated to a position in the lower portion of the cylinder, where it is temporarily held by the hooks 32. Owing to the fact that the pad 17 has been previously saturated with a suitable oil or grease, it is obvious that in the successive lifting movement of the pans, the undersides of said pans will be suitably oiled and it will also be seen that as the batter containing pans are elevated one against the other in the cylinder to the left, the batter contained in each of said pans will by contact with the next higher pan, be properly spread or distributed within the pan depression. During the traveling movement of the pans downward through the cylinder to the right and upward in the cylinder to the left, it is obvious that the pans and their contents will be subjected to a desirable degree of baking heat through the influence of the flame at the burners 29, the heat from which will be contributed to the cylinders and their contents. When the cylinder to the left, has been, in the manner described, filled to the top with the successively arranged pans, the upper side of the upper pan will be flush with the upper end of the cylinder and when the next succeeding pan is elevated into the lower end of the cylinder, it is obvious that said top pan will be forced upward out of the cylinder, its marginal portion pressing against the beveled surfaces of the clamping ring lugs 43ª of that clamping ring which is temporarily stationary and immediately over said cylinder to the left. In this contact of the upper pan with said lugs, it is obvious that the two hinged or pivoted members 42 and 43 of the clamping ring, will be spread apart until said lugs by action of the spring 47, move inward into engagement with the side of the pan, said pan being thus held by the clamping ring.

By the means heretofore described, the necessary rotary movement imparted to the shaft 3, will carry the pan holding ring to a position at right angles with its first described position and bring another of the clamping rings over the cylinder to the left in position to receive the next succeeding pan. As each of the pinions 39 travels over the rack section 48, the resultant rotation of the shaft on which said pinion is mounted, will cause the ring and the pan contained therein to be inverted, thereby discharging the baked product into any suitable receptacle arranged at the side of the machine. As the contents of each pan is thus discharged, the ring carrying the same will on its next movement, be brought to a point immediately over the cylinder 27 at the right. As the clamping ring moves to this position, a rounded projection 42ª of the bifurcated end of the clamping ring member 42, comes into frictional engagement with the contact member 49, with the result that the pin 45 is forced toward one end of the slot 46 of the yoke 41 and the sections 42 and 43 are thereby moved outward from each other, whereby the pan which is held by the said ring sections, is released and dropped into the cylinder beneath. It being desirable to provide enough pans to keep both the cylinders filled, it is obvious that as the first lot of pans are successively removed from the cylinder to the right, pans may be inserted by hand into the top of said cylinder. Owing to the fact that the pans are inverted as described, it will be understood that both sides of each of the pans will be subjected to the oiling contact of the pad 17.

From the construction and operation described, it will readily be understood that baked cakes or products will be successively and rapidly delivered from the machine. While my improved baking mechanism is found to be particularly effective in the production of baked products such as are afterward converted into conical ice cream receptacles or ice cream cones, it is obvious that my improved baking machine will be of great utility where it is desirable to rapidly and economically produce baked cakes of any character.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is—

1. In a machine of the character set forth, the combination of a vertical column of nested molds in tandem, means for advancing the molds, an unloading device, including a carrier adapted to turn on an axis, said carrier equipped with means for engaging the uppermost mold of the column, and a loading device, including a carrier adapted to present a fresh mold to the lower end of the column of molds.

2. In a machine of the character set forth, the combination of a column of molds, means for advancing the molds, and loading and unloading means, including an upper and lower carrier, said carriers adapted to turn about substantially vertical axes.

3. In a machine of the character set forth, the combination of a column of molds, means for advancing the molds, a return conduit, an upper carrier adapted to receive the uppermost mold from the column and discharge it through the return conduit, and a lower carrier adapted to receive the empty mold from the return conduit and present it to the bottom end of the column of molds.

4. In a machine of the character set forth, the combination of a column of molds, means for advancing the molds, unloading and returning means, including a return mold conduit, a carrier equipped with a mold-socket adapted to be presented beneath said conduit and then beneath the column of molds, and means associated with the mold-advancing means for engaging the freshly presented mold.

5. In a machine for molding and baking pastry, the combination of a series of individual molds arranged in successively cooperating relation and forming a vertical column, means for advancing said molds, and means for applying heat thereto.

6. A baking machine comprising a heating chamber, a return heating passage, baking units, means for forcing said units through said chamber, and means for engaging said units upon exodus from said chamber and inverting and delivering them to said passage.

7. A baking machine comprising a heating chamber having an open bottom, a return heating chamber having an open bottom, baking units, resilient catches for maintaining said baking units within said chambers, a socketed carrier beneath said chambers and having its sockets adapted to aline therewith, automatic means for releasing the catches in said return chamber to permit a baking unit to drop into the socket of said carrier, means for rotating said carrier to aline said plate carrying socket with said heating chamber, and automatic means for forcing said baking unit upwardly into said heating chamber.

8. A baking machine comprising a heating chamber having an open bottom, a return heating chamber having an open bottom, baking units, resilient catches for maintaining said baking units within said chambers, a socketed carrier beneath said chambers and having its sockets adapted to aline therewith, an automatic plunger for releasing the catches of said return chamber to permit a baking unit to drop into the socket of said carrier, means for rotating said carrier to aline said plate carrying socket with said heating chamber, and an automatic plunger for forcing said plate upwardly out of said socket and into said heating chamber to be gripped by said catches.

9. A baking machine comprising a heating chamber having an open bottom, a return heating chamber having an open bottom, baking units, resilient catches for maintaining said baking units within said chambers, a socketed carrier beneath said chambers and having its sockets adapted to aline therewith, an automatic plunger for releasing the catches of said return chamber to permit a baking unit to drop into the socket of said carrier, means for rotating said carrier to aline said plate carrying socket with said heating chamber, an automatic plunger for forcing said plate upwardly out of said socket and into said heating chamber to be gripped by said catches, and an oiling pad on said last-named plunger.

10. A baking machine comprising a vertical heating chamber, a vertical return heating chamber in juxtaposition therewith, baking units, automatic catches forming the base supports for said baking units and mounted respectively in said baking chamber and said return chamber, a cam operated plunger for intermittently releasing the catches in said return chamber, a conductor for receiving the unit released by the release of said catches and conducting the same to a point beneath said baking chamber, and a cam operated plunger for forcing said baking unit upwardly into said baking chamber.

In testimony whereof I affix my signature in presence of two witnesses.

JAMES W. LAWHEAD.

Witnesses:
C. C. SHEPHERD,
JOSEPH P. EAZTERN.

Copies of this patent may be obtained for five cents each, by addressing the "Commissioner of Patents, Washington, D. C."